United States Patent

[11] 3,631,353

[72] Inventors Herbert S. Jarecki
E. Rutherford;
Bob N. Naydan, Wyckoff, both of N.J.
[21] Appl. No. 871,430
[22] Filed Oct. 24, 1969
[45] Patented Dec. 28, 1971
[73] Assignee The Singer Company
New York, N.Y.
Continuation-in-part of application Ser. No. 641,347, May 25, 1967, now abandoned. This application Oct. 24, 1969, Ser. No. 871,430

[54] MULTIPLEXING ARRANGEMENT USED IN CONVERTING AN AC SIGNAL TO A DC SIGNAL
3 Claims, 7 Drawing Figs.

[52] U.S. Cl..................................................... 328/139, 328/151, 328/166
[51] Int. Cl..................................................... H03b 1/04
[50] Field of Search........................................ 328/26, 28, 31, 165–167, 151, 155, 139; 333/70 R, 76

[56] References Cited
UNITED STATES PATENTS
| | | | |
|---|---|---|---|
| 3,041,479 | 6/1962 | Sikorra.......................... | 328/166 UX |
| 3,119,984 | 1/1964 | Brandt et al.................. | 328/151 X |
| 3,223,848 | 12/1965 | Molnar et al.................. | 328/166 X |

*Primary Examiner*—John Zazworsky
*Attorneys*—S. A. Giarratana and S. Michael Bender

ABSTRACT: A method of converting an AC voltage to a DC voltage corresponding substantially to the fundamental sinusoidal AC components by dropping said AC voltage through an input line across a series resistor and parallel capacitor, to an output line, comprising the step of opening up the input line at a predetermined time of the changing input sinusoidal voltage depending on its frequency and the values of the capacitor and resistor so as to obtain a DC voltage having a large percentage of the AC sinusoidal fundamental component while minimizing the effects of the harmonic and quadrature content.

INVENTORS
HERBERT S. JARECKI
BOB N. NAYDAN

BY

ATTORNEY

INVENTORS
HERBERT S. JARECKI
BOB N. NAYDAN
BY
George B. Oujevolk
ATTORNEY

INVENTORS
HERBERT S. JARECKI
BOB N. NAYDAN 3,631,353

MULTIPLEXING ARRANGEMENT USED IN CONVERTING AN AC SIGNAL TO A DC SIGNAL

This application is a continuation-in-part of application Ser. No. 641,347, filed May 25, 1967, now abandoned and commonly assigned.

BRIEF SUMMARY OF THE INVENTION

The present invention relates to the conversion of an AC input into a corresponding DC signal which can be used in an analog to digital converter.

In various instruments, the external input, e.g., velocity is measured by AC instruments. To convert the AC output into digital form, the AC must often be converted into DC.

Heretofore, the AC to DC conversion was often obtained by either instantaneous sampling the peak of the AC signal or taking the RMS AC value. However, an AC signal is an extremely complex thing. The signal is depicted schematically as a sinusoidal wave shape. This theoretical wave is not what is produced in reality. On the contrary, the wave shape produced contains the basic signal as well as quadrature voltage factors and harmonic voltages. By merely sampling the RMS or peak value of the wave, the quadrature and harmonic rejection obtainable is too low for many accurate system requirements.

According to the present inventive concept, the input AC is passed through an RC integrator structure having certain predetermined values, together with a switching arrangement. The circuit values and gating times are arranged to produce the desired combinations of optimum output signal, quadrature and harmonic rejection.

BRIEF DESCRIPTION OF INVENTION

Figure 1:
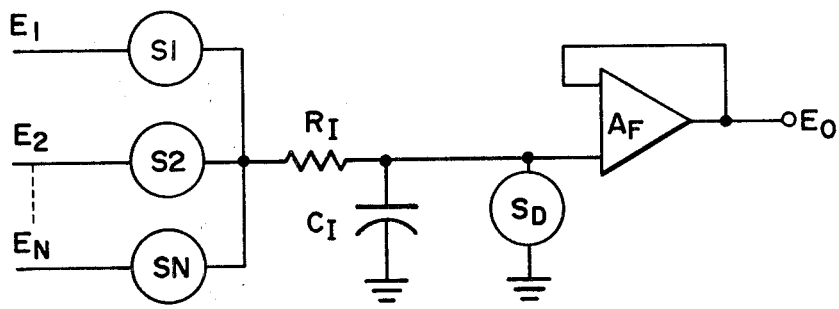
FIG. 1 is a partly schematic partly block diagram explanation of the inventive concept.

Turning now to FIG. 1, there is shown a representative circuit embodying the principals of the present invention and including a plurality of input lines controllably energized by a like plurality of switches $S_1, S_2...S_N$. Each input line, when its respective switch is in a closed condition, is adapted to apply an AC sinusoidal voltage $E_1, E_2,...E_N$ across an RC network comprising a series resistor $R_I$ and a capacitor $C_I$ connected in parallel between resistor $R_I$ and ground. The output of this RC network is directly coupled to an amplifier $A_F$ which functions merely as a buffer reproducing at its output exactly that which appears at its input. The circuit of FIG. 1, includes finally, a switch $S_D$ coupled in parallel between the output of the RC network and ground for selectively discharging the voltage stored on capacitor $C_I$ when the switch is actuated to a closed condition.

Signals $E_1$ through $E_N$ respectively include a fundamental frequency component, harmonics thereof, as well as quadrature components. Thus, in the operation of the circuit of FIG. 1, assume that switches $S_2$ through $S_N$ and $S_D$ are all open circuited and that $S_1$ is closed or short circuited. The input voltage $E_1$ then will consist of a fundamental frequency component $A_1 \sin \omega t$, odd harmonic frequency components $$A(2N-1) \sin (2N-1)\omega t \Big|_{N=2}^{\infty}$$

and a quadrature component $B_1 \cos \omega t$.

Using LaPlace transformation techniques, the output signal $E_o$ may be expressed as:

$$E_o = \frac{A_1 \omega R_I C_I}{1+(\omega R_I C_I)^2}\left[e^{-t}|_{R_I C_I} + \frac{1}{\omega R_I C_I} \sin \omega t - \cos \omega t\right.$$

(fundamental term) $+ \dfrac{A_{(2-1)}{}^{(2N-1)\omega R_I C_I}}{1+[2N-1)\omega R_I C_I]^2} e^{-t}{}_{R_I C_I}$ $+ \dfrac{1}{(2N-1)\omega_{R_I} C_I} \sin(2N-1)\omega t - \cos 2N$ $\left. - D\omega t \right]\,\, N=2$ (harmonics term)

$+ \dfrac{B_1(\omega R_I C_I \sin \omega t + \cos \omega t - e^{-t}{}_{R_I C_I})}{1+(\omega R_I C_I)^2}$ (quadrature term)  (1)

Figure 2A:
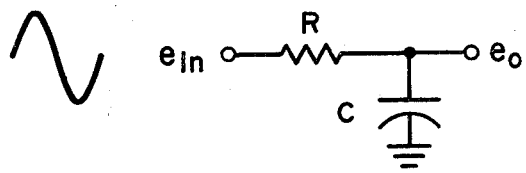
FIG. 2a represents schematically some of the equivalent circuitry of FIG. 1.

The derivation of the foregoing equation is obtained from FIGS. 2a, 2b, and 2c and LaPlace transfer function tables as follows. Considering the circuit of FIG. 1 from the standpoint of the equivalent circuit shown in FIG. 2a, the transfer function of an RC network is:

$$\frac{e_o}{e_{in}} = \frac{1/SC}{R+1/SC} = \frac{1}{SRC+1} = \frac{1/RC}{S+1/RC}$$

$$e_{in} = (\text{sine wave}) = \frac{E_{(s)}\omega}{s^2+\omega^2}$$

$e_o = e_{in}$ (Transfer Function)

$$= \left(\frac{E_{(s)}\omega}{s^2+\omega^2}\right)\left(\frac{1/RC}{s+1/RC}\right)$$

$= \text{Let } RC = T$ $$e_o = \left(\frac{E_{(s)}\omega}{s^2+\omega^2}\right)\left(\frac{1/T}{s+1/T}\right)$$

From Gardner and Barnes, Volume 1, "Transients in Linear Systems," page 341, Item 1.216

$$\frac{s+a_0}{s(s+\alpha)(s^2+\beta^2)}$$

$$= \frac{a_0}{\alpha\beta^2} + \frac{\alpha-a_0}{\alpha(\alpha^2+\beta^2)} e^{-\alpha t} - \frac{1}{\beta^2}\left[\frac{a_0{}^2+\beta^2}{\alpha^2+\beta^2}\right]^{1/2} \cos(\beta t + \psi)$$

in this case $a_0 = 0$ $\alpha = 1/T$ $\omega = \beta$ $$\psi = \tan^{-1}\frac{\beta}{a_0} - \tan^{-1}\frac{\beta}{\alpha}$$

The LaPlace transform will be $$= \frac{\omega E_{(s)}}{T}\left[1/T0 + \frac{1/T-0}{1/T(1/T^2+\omega^2)} e^{-t/T}\right.$$

$$\left. -\frac{1}{\omega^2}\left[\frac{0+\omega^2}{1/T^2+\omega^2}\right]^{1/2} \cos(\omega t + \psi)\right]$$

$\psi = 90° - \tan^{-1} \omega/2$ $$= \frac{\omega E_{(s)}}{T}\left[\frac{T^2}{1+(\omega T)^2} e^{-t/T} - \frac{1}{\omega^2}\left[\frac{T^2\omega^2}{1+(\omega T)^2}\right]^{1/2} \cos(\omega t + \omega)\right]$$

$$= \left[\frac{\omega E_{(s)}}{T}\frac{T^2}{1+(\omega T)^2} e^{-t/T} - \frac{T^2}{\omega\sqrt{1+(\omega T)^2}}(\cos[\omega t + \psi])\right]$$

Figure 2B:
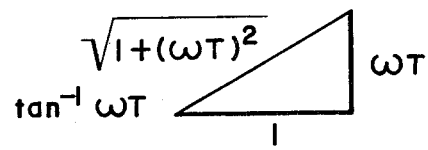
FIG. 2b is a mathematical explanation of some of the expressions given in the specification.

However, $\cos(\omega t + \psi) = \cos(\omega t + 90 - \tan^{-1} \omega T)$ $\quad = \sin(\tan^{-1} \omega T - \omega t)$ $\quad = -\sin(\omega t - \tan^{-1} \omega T)$ $\quad = -[\sin \omega t \cos[\tan^{-1} \omega T] - \cos \omega t \sin[\tan^{-1} \omega T]$ From Figure 2b, the following are the trigonometric relationships $$\sin[\tan^{-1} \omega T] = \frac{\omega T}{\sqrt{1+(\omega T)^2}}$$

$$\cos [\tan^{-1} \omega T] = \frac{1}{\sqrt{1+(\omega T)^2}}$$

Therefore, $$\cos (\omega t + \psi) = \left[\frac{\omega t}{\sqrt{1+(\omega T)^2}} \cos - \frac{1}{\sqrt{1+(\omega T)^2}} \sin \omega t\right]$$

Therefore, $$e_o{}^s(t) = \frac{\omega}{T} E_s \left\{ \frac{T^2}{1+(\omega T)^2} e^{-t/T} - \frac{1}{\omega\sqrt{1+(\omega T)^2}} \right.$$

$$\left. \left[\frac{\omega T}{\sqrt{1+(\omega T)^2}} \cos \omega t - \frac{1}{\sqrt{1+(\omega T)^2}} \sin \omega t\right]\right\}$$

$$= \frac{E_s}{1+(\omega T)^2} \{\omega T e^{-t/T} + \sin \omega t = \omega T \cos \omega t\}$$

Dividing by $\omega T$, $$= \frac{E_{(s)} \omega T}{1+(\omega T)^2} \left(e^{-t/T} + \frac{\sin \omega t}{\omega T} - \cos \omega t\right)$$

Resubstituting $T = RC$ $$= \frac{E_{(s)} \omega RC}{1+(\omega RC)^2} \left[e^{-t/RC} + \frac{\sin \omega t}{\omega RC} - \cos \omega t\right]$$

To obtain terms for quadrature input, the cosine input is applied as follows:

$$e_{\text{in}} = (\cos \text{ wave}) = E_{(s)} \frac{s}{s^2+\omega^2}$$

The expression for a cosine wave is:

$$e_o = E_{(s)} \left(\frac{s}{s^2+\omega^2}\right)\left(\frac{1/RC}{s+1/RC}\right)$$

Figure 2C:
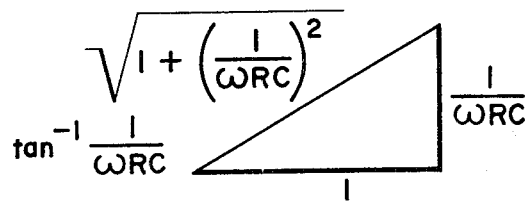
FIG. 2c is a similar mathematical expression of some of the expressions given in the specification.

From the aforementioned book of Gardner and Barnes Equation 1.210, $$\frac{s+a_o}{(s+\alpha)(s^2+\omega^2)} = \frac{a_o - \alpha}{\alpha^2+\omega^2} e^{-\alpha t} + \frac{1}{\omega}\sqrt{\frac{a_o{}^2+\omega^2}{\alpha^2+\omega^2}} \sin (\omega t + \phi)$$

or $$\phi = \tan^{-1}\frac{\omega}{a_o} - \tan^{-1}\frac{\omega}{\alpha}$$

$$\phi = \tan^{-1}\frac{\alpha}{\omega} - \tan^{-1}\frac{a_o}{\omega}$$

$$a_o = 0$$

therefore, $$e_o = \frac{E_s}{RC}\left[\frac{-1/RC}{(1/RC)^2+\omega^2} e^{-t/RC} + \frac{1}{\sqrt{(1/RC)^2+\omega^2}} \sin (\omega t + \phi)\right] \quad (2)$$

$$= E_{(s)} - \left[\left(\frac{1}{(RC\omega)^2+1}\right)e^{-t/RC} + \frac{1}{\sqrt{1+(RC\omega)^2}} \sin (\omega t + \phi)\right]$$

where $$\phi = \tan^{-1}\frac{1/RC}{2\pi 400}$$

$$= \tan^{-1}(1/RC\omega)$$

$$\sin (\omega t + \phi)$$
$$= \sin \omega t \cos \phi + \omega t \sin \phi$$

$$\sin t \cos \left(\tan^{-1}\frac{1}{RC\omega}\right) + \cos \omega t \sin \left(\tan^{-1}\frac{1}{RC\omega}\right)$$

and from Figure 2c $$\cos \left(\tan^{-1}\frac{1}{\omega RC}\right) = \frac{1}{\sqrt{1+(1/\omega RC)^2}}$$

$$\sin \left(\tan^{-1}\frac{1}{\omega RC}\right) = \frac{(1/\omega RC)}{\sqrt{1+(1/\omega RC)^2}}$$

hence, $$\sin (\omega t + \phi) = \frac{\sin \omega t}{\sqrt{1+(1/\omega RC)^2}} + \frac{\cos \omega t (1/\omega RC)}{\sqrt{1+(1/\omega RC)^2}}$$

$$= \frac{\omega RC (\sin \omega t)}{\sqrt{1+(\omega RC)^2}} + \frac{\omega RC (\sin \omega t) + \cos \omega t}{\sqrt{1+(\omega RC)^2}}$$

Resubstituting into equation (2)

$$E_0 = E_s \left[\left(\frac{1}{-(\omega RC)^2+1}\right)e^{-t/RC} + \frac{\omega RC(\sin \omega t) + \cos \omega t}{1+(\omega RC)^2}\right]$$

$$= E_s \left[\frac{-e^{-t/RC} + \omega RC \sin \omega t + \cos \omega t}{1+(\omega RC)^2}\right] \quad (3)$$

Equation (3) may now be expanded and reexpressed in the form of equation (1).

In accordance with the present invention, the purpose of using the circuit configuration of FIG. 1 is to obtain an output DC voltage $E_o$ that is proportional to the input fundamental AC voltage. Moreover, since the harmonic and quadrature components of the input signal contain no useful information, it is desirable to reduce the effects of these components on the output voltage as much as possible. This is accomplished according to the present invention in the following prescribed manner. Noting from equation (1) that the output level $E_o$ will vary for different values of $\omega RC$ and $\omega t$, equation (1) is solved over a given range of such values by setting the quadrature term in the equation equal to zero. That is, for each preselected value of $\omega RC$, $\omega t$, and zero quadrature component equation (1) may be solved to yield corresponding values of output voltage $E_o$ which latter includes contribution from both the input fundamental component and the input harmonic components. The results of such a computation for representative values of $\omega RC$ and $\omega t$ where $A_1$, $A(2N-1)$, and $B_1$ have been normalized to 1 are reproduced in the five leftmost columns of the following table:

TABLE

| $\omega RC$ | $\omega t$ | Quad. comp. | $E_0$ due to fund comp. | 3rd harmonic comp. | $\dfrac{dE_0}{E_0} \Big/ \dfrac{dR_1C_1}{R_1C_1}$ |
|---|---|---|---|---|---|
| 0.0 | $\pi/2$ | 0 | 1 | 1 | 0 |
| 0.5 | $\frac{116}{180}\pi$ | 0 | .091 | .565 | 167 |
| 0.8 | $\frac{125}{180}\pi$ | 0 | .808 | .350 | .290 |
| 1.0 | $\frac{131}{180}\pi$ | 0 | .757 | .212 | .347 |
| 1.2 | $\frac{3}{4}\pi$ | 0 | .708 | .137 | .391 |
| 1.4 | $\frac{139}{180}\pi$ | 0 | .660 | .058 | .441 |
| 1.6 | $\frac{141}{180}\pi$ | 0 | .623 | .019 | .485 |
| 1.8 | $\frac{143.5}{180}\pi$ | 0 | .597 | .027 | .517 |
| 2.0 | $\frac{146}{180}\pi$ | 0 | .571 | .067 | .542 |
| 3.0 | $\frac{154}{180}\pi$ | 0 | .436 | .182 | .604 |
| 5.0 | $\frac{162}{180}\pi$ | 0 | .303 | .265 | .755 |
| 10.0 | $\frac{169}{180}\pi$ | 0 | .173 | .338 | .865 |
| $\infty$ | $\frac{180}{180}\pi$ | 0 | 0 | 0 | 1.000 |

From this table it will be observed that for certain optimum values of $\omega RC$ and $\omega t$, the output signal $E_o$ will comprise a voltage term substantially proportional to the input fundamental with almost complete attenuation of the first odd harmonic, i.e., the third harmonic, and with of course, complete rejection of the quadrature component. To illustrate by way of example, assume that a sinusoidal AC input signal $E_1$ of known frequency is impressed across the RC network of FIG. 1 wherein from the above table $\omega RC$ is chosen to be equal to 1.6. Suppose now that at a time $T_o$ corresponding to the beginning of a cycle of the input waveform switch $S_1$ is short circuited and switch $S_D$ is opened thereby causing capacitor $C_I$ to charge up. From the table, the corresponding value for $\omega t$ is equal to $(141/180)\pi$ radians which means that if the switch $S_1$ is then opened at a later time $T_1$ corresponding to 141° of angular displacement of the input waveform, the voltage appearing across capacitor $C_I$ (i.e., at the output of the RC network and therefore the output of amplifier $A_F$) will comprise a voltage $E_o$ having no quadrature component, a component equal to 0.623 of the input fundamental and a component equal to only 0.019 of the input third harmonic. It is apparent therefore that the voltage held on capacitor $C_I$ at the end of the time interval $T_o$–$T_1$ will comprise a DC voltage substantially proportional to the input AC fundamental. Switch $S_D$ may then be short-circuited thereby discharging capacitor $C_I$ to ground and resetting the circuit in preparation for the next input cycle which, of course, may be that associated with, say, the input signal $E_2$ being applied to the RC network of FIG. 1 through switch $S_2$. Input signal $E_2$ will thus be held across capacitor $C_I$ for the time interval $T_o$–$T_1$ in a manner exactly identical to that described above with the remaining channels $E_3$–$E_N$ being processed in similar fashion.

The question may arise as to what effect changes in $R_I C_I$ due to aging of the components, temperature changes, and the like have on the output voltage $E_o$. By partially differentiating equation (1) an expression may be derived representing the percentage change in $E_o$ with respect to a percentage change in $R_I C_I$. Thus:

$$\frac{\partial E_0}{\partial R_I C_I} = \frac{e^{-t/R_I C_I}[\omega R_I C_I] - (\omega R_I C_I)^3 + \omega t + \omega t (\omega R_I C_I)^2]}{\omega R_I C_I [1 + (R_I C_I)][e^{-tR/C} + (1/RC) \sin t - \cos t]}$$

By substituting the corresponding values of $\omega RC$ and $\omega t$ into this equation the sensitivity factors for such values may be given. These values are reproduced in the rightmost column of the table. Thus, in the illustrated example where $\omega RC$ is equal to 1.6, the corresponding sensitivity factor is equal to 0.485 which indicates that for every unit change in $R_I C_I$ the charge in $E_o$ is only about half as much. Thus it may be concluded that the circuit of FIG. 1 is virtually insensitive to changes in RC and this constitutes one of the important advantages of the present invention.

Figure 3:
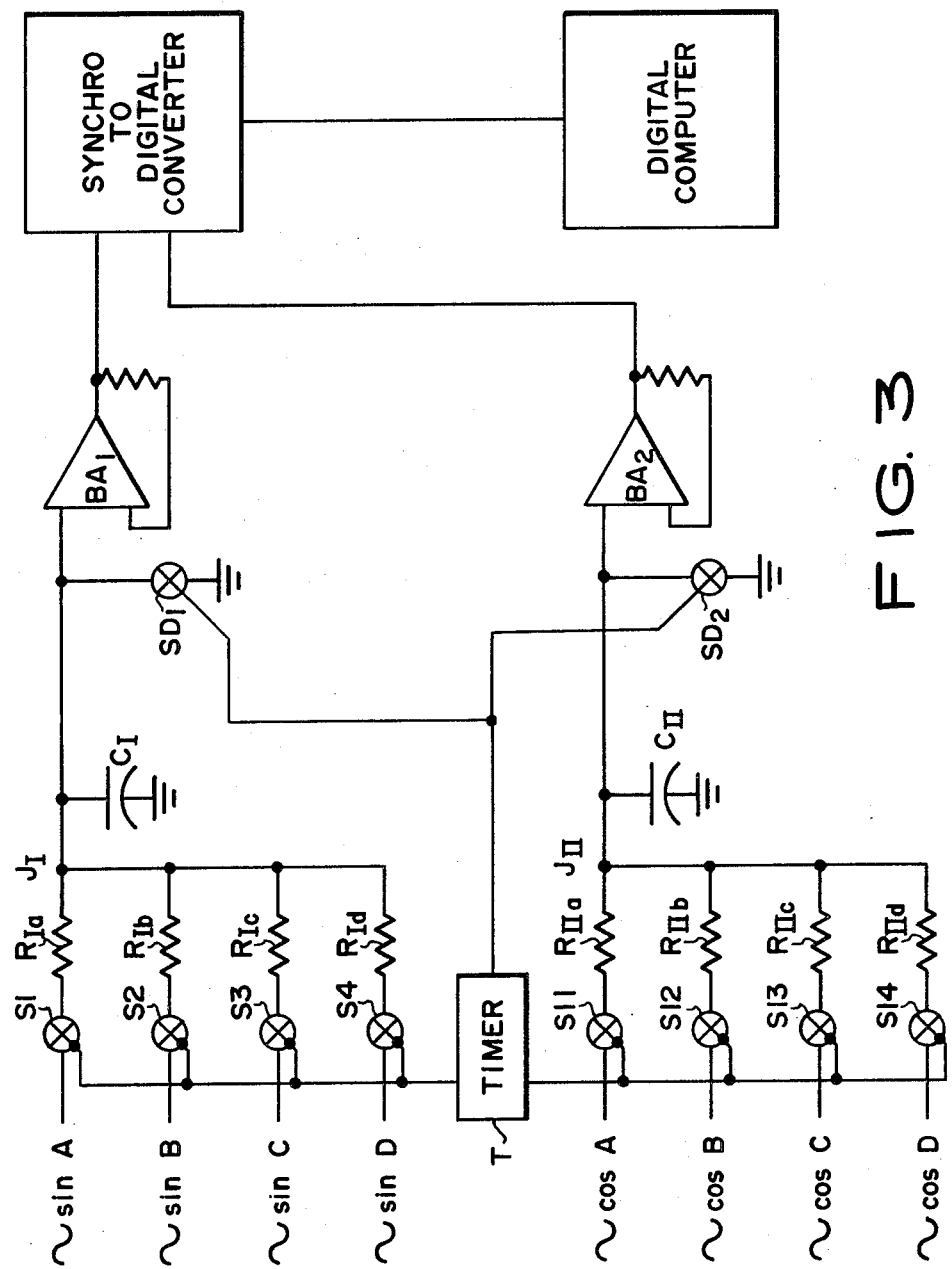
FIG. 3 is a schematic diagram of one embodiment of the invention.

In carrying out the principles of the present invention as described hereinabove with reference to FIG. 1, it is important that switches $S_1$ through $S_N$ and $S_D$ be properly actuated in the preferred sequence so as to apply the input AC signal from each selected channel across the RC network for the interval of time $T_o$–$T_1$, it being recalled that $T_o$ represents the beginning of a cycle of the input fundamental waveform. A sequence or timing means for accomplishing this purpose will now be described in connection with FIGS. 3 through 5. Turning now to FIG. 3, there is shown an AC to DC converter in accordance with the present invention, which converter may be used in connection with an analog-to-digital converter such as that described in the George F. Schroeder et al. U.S. Pat. No. 3,071,324. The arrangement shown in FIG. 3 depicts four inputs, sin A, cos A; sin B, cos B; sin C, cos C; sin D, cos D. These inputs are applied to the type of circuit arrangement shown in FIG. 1. In the case of FIG. 3, there are both a sine and a cosine channel so that in addition to switches $S_1$ through $S_4$ for the sine channel there is also a cosine channel having switches $S_{11}$ through $S_{14}$ to which the cosine inputs cos A through cos D are applied. Each input is applied across a separate line with a separate resistor; namely, $R_{Ia}$ for sin A, $R_{Ib}$ for sin B, etc. and $R_{IIa}$ for cos A, $R_{IIb}$ for cos B, etc. The various switches $S_1$ through $S_4$ and $S_{11}$ through $S_{14}$ are operated by a timer T. Only one channel at a time is connected to the input to the AC to DC converter junction points $J_I$ and $J_{II}$. The particular input passes through capacitors $C_I$ and $C_{II}$ past short circuit switches $SD_1$ and $SD_2$ which likewise are operated by timer T. From there the converted signal goes to buffer amplifiers $BA_1$ and $BA_2$ and emerge as the DC input to the synchro-to-digital converter described in the aforesaid Schroeder et al. U.S. Pat. No. 3,071,324. The output of the synchro-to-digital converter is then processed in a digital computer.

Figure 4:
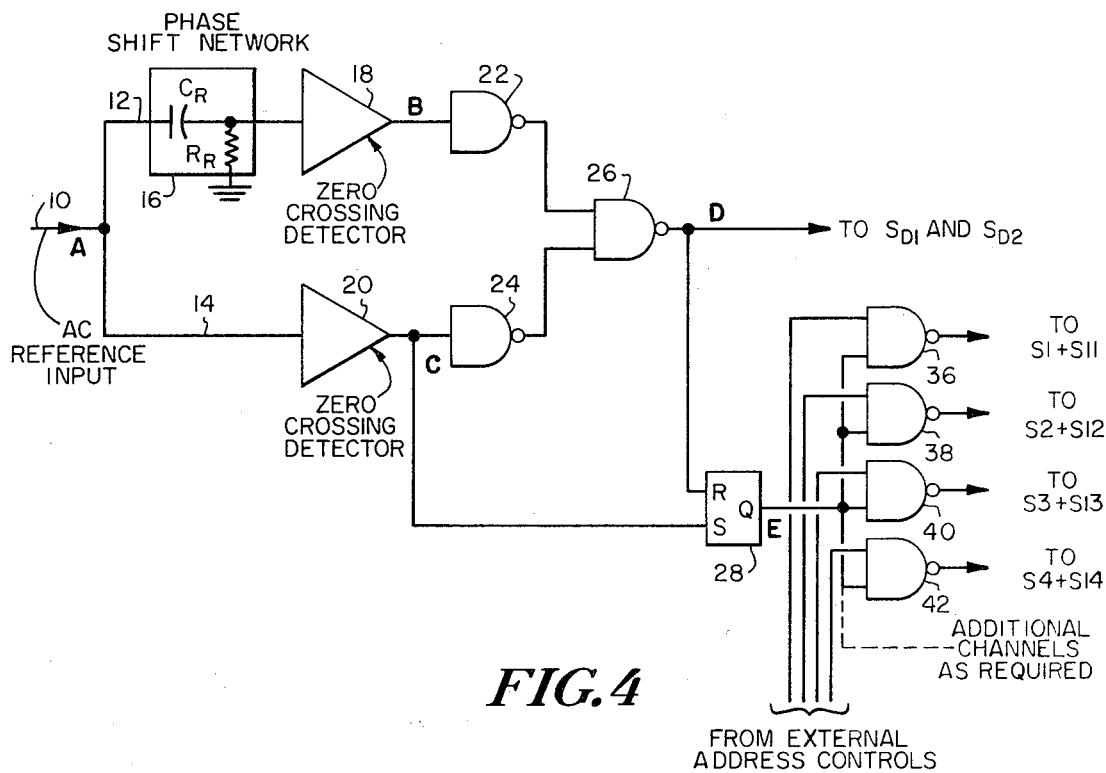
FIG. 4 is a schematic circuit diagram showing a portion of the embodiment of FIG. 3 in more detail.
Figure 5:
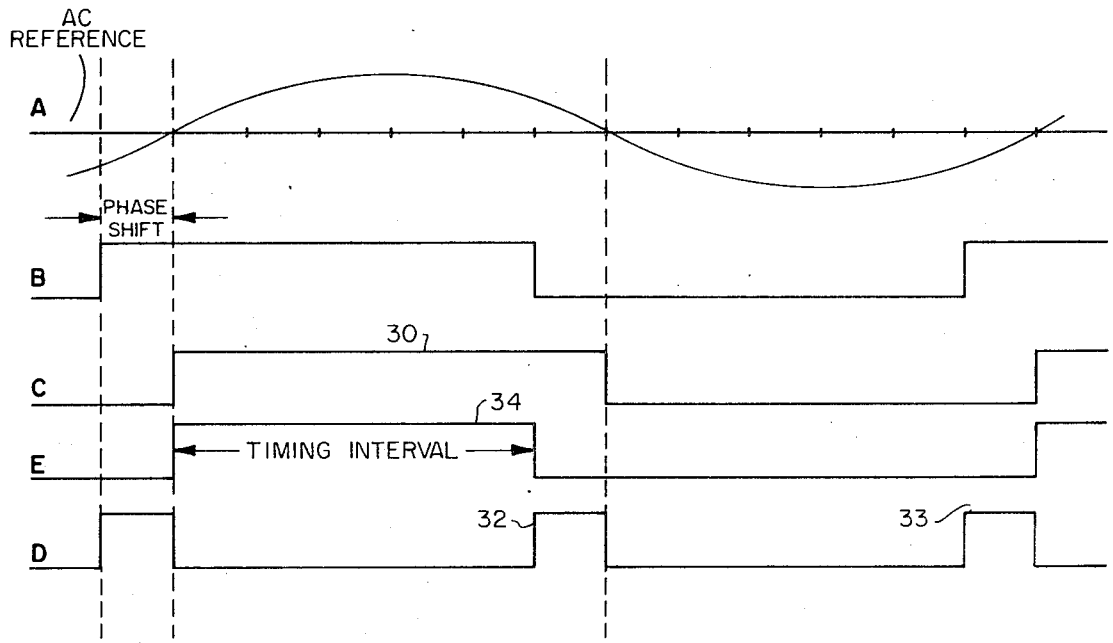
FIG. 5 is a timing diagram showing the relationship among the various signal waveforms produced within the circuit of FIG. 4.

As shown in more detail in FIG. 4, the timer T may comprise in its preferred form an input line 10 for receiving an AC reference input signal the frequency and phase of which is substantially equal to that of each AC signal being sampled by switches $S_1$–$S_4$ and $S_{11}$–$S_{14}$. This AC reference signal may be obtained from any convenient, well-known source such as an oscillator, for example. The input AC reference signal which has a waveform substantially as indicated by the letter A in FIG. 5, is simultaneously applied along a pair of branch lines 12 and 14 to a phase shift network 16 and a zero-crossing detector 18. The output of phase shift network 16 is also coupled to a zero-crossing detector 20, the latter being substantially identical to detector 18. Phase shift network 16 which comprises a conventional capacitor-resistor combination produces at its output a waveform which leads the waveform appearing on line 14 at the input of zero-crossing detector 20 by an amount determined by the respective values of $C_R$ and $R_R$ as is well known in the art. Thus, for example, assume again that the circuit of FIG. 3 has been designed wherein from the table, $\omega RC$ is equal to 1.6 and $\omega t$ is equal to $(141°/180°)\pi$ radians. Then the phase shift $\Phi$ of network 16 will be equal to 180°- 141° or 39° of angular displacement in degrees electrical.

Zero-crossing detectors 18 and 20 which as explained above are exactly identical to one another are conventional logic components respectively adapted to provide a low or logical "zero" output for all negative inputs and a high level or logical "one" output for all positive inputs. Therefore, taking into consideration the 39° phase lead of the signal input to detector 18, the output waveforms of detectors 18 and 20 will appear as rectangular pulse trains represented respectively, by waveforms B and C in FIG. 5. The rectangular pulse output of zero-crossing detector 18 is applied to the input of NAND-gate 22 while the rectangular pulse output of zero-crossing detector 20 which lags that of zero-crossing detector 18 by 39° is applied simultaneously to the input terminal of NAND-gate 24 and to the set input of flip-flop 28. Each of the NAND circuits employed in the present invention is of a well-known type which is responsive to a coincidence of positive potentials or high-level logic "ones" applied to its inputs to produce a zero potential or low-level logical "zero" at its output and is also responsive to a zero potential applied to any one of its inputs to produce a positive output potential. Thus, when the NAND gate has only one input as is the case with NAND-gates 22 and 24, it functions merely as an inverter circuit. On the other hand NAND-gate 26 which has as its inputs the respective outputs of inverters 22 and 24 functions as pure logical NAND as described above. The output of NAND-gate 26 is simultaneously applied to the reset input of flip-flop 28 and to switches $SD_1$ and $SD_2$ of FIG. 3. Because of the inverter action of NAND-gates 22 and 24, this output signal will be high or at the logical "one" level only when there is a lack of coincidence between the high-level logical "one" portion of outputs B and C (FIG. 5) brought about the previously described 39° phase shift therebetween. Thus, the output of NAND-gate 26 may be represented by the pulse train D of FIG. 5.

Flip-flop 28 is adapted to produce a high-level or logical "one" output when a high-level or logical "one" input is applied to its set input and to maintain this out-put until a high-level or logical "one" input is applied to its reset input at which point the flip-flop will be triggered to produce a low-level or logical "zero" at its output until a subsequent logical "one" is once more applied to its set input. Thus, with reference to FIG. 5, flip-flop 28 is triggered to its logical "one" output condition by the leading edge of each pulse 30 in the output pulse train C of zero-crossing detector 20 and is reset to its logical "zero" output condition by the leading edge of each alternate pulse 32 in the output pulse train D of NAND-gate 26. The result is a pulse train output from flip-flop 28 having a waveform indicated at E in FIG. 5. Each of the pulses 34 in this output signal will be high or at the logical "one" level for a duration or pulse width equal to 141° electrical starting at the beginning of each cycles of the input AC reference signal. Accordingly, each pulse 34 in the output signal E of flip-flop 28 may be adapted as a timing signal for applying the input signals sin A—sin D, and cos A—cos D across the respective RC networks of FIG. 3. Toward this end, the output of the flip-flop 28 is commonly connected to a series of four NAND-gates 36–42, each of which latter has its output coupled to a pair of corresponding switches for applying the correct synchro output across the networks $R_I C_I$ and $R_{II} C_{II}$ of FIG. 3. Thus, for example, NAND-gate 36 has its output connected to switches $S_1$ and $S_{11}$ for actuation thereof to a closed condition, NAND-gate 38 has its output connected to switches $S_2$ and $S_{12}$, and so on.

NAND-gates 36 through 42 also have a second input connected thereto respectively from an external address control or a multiplexing switch as shown (FIG. 4) whereby each pair of corresponding switches $S_1$, $S_{11}$, $S_2$, $S_{12}$, etc. may be enable sequentially in a time-shared manner as is well known in the art.

Thus, in the operation of the timer circuit of FIG. 4, assume that a 141° pulse interval is beginning wherein the output of flip-flop 28 goes high as indicated at E in FIG. 5, and there simultaneously appears an enabling pulse along, say, the secondary input line of NAND 36. In response, the NAND gate logical output gate 36 will produce a "zero" since both of its inputs are now high or logical "ones," which output will in turn, actuate switches $S_1$ and $S_{11}$ to their closed condition. This, then, will cause the corresponding sin A and cos A input AC signals to be applied across the networks $R_I C_I$ and $R_{II} C_{II}$ for the interval of time determined by the width of pulse 34. The leading edge of pulse 32 will trigger or reset flip-flop 28 causing the primary input to NAND-gate 36 to go to "zero." The output of NAND 36 will therefore also drop to "zero" thereby opening switches $S_1$ and $S_{11}$. At the same time, the pulse 32 is being applied to switches $SD_1$ and $SD_2$ for actuating these switches to a closed condition and causing them to connect the output of capacitors $C_I$ and $C_{II}$ to ground thereby discharging the voltages on these capacitors which were built up during the previous 141° interval. The next pulse 33 in the pulse train output of NAND-gate 26 will then actuate switches $SD_1$ and $SD_2$ to their open-circuited condition to prepare the RC networks for the next sampling cycle which, of course, will begin by the closure of the next pair of switches $S_2$ and $S_{12}$ in the same manner described above.

It is thus seen that the present invention contemplates a scheme for converting an AC input to a DC output which latter is primarily a function of the AC fundamental frequency with the input quadrature components being entirely rejected and the input harmonics being substantially attenuated. In its broadest form, the circuit of the present invention comprises an AC input line with its return path, a switch and a resistor in series with the input line, a capacitor in parallel across said line and its return path and a buffer amplifier fed by said line, discharging its output into a DC output line. At a predetermined angular position of the changing input sinusoidal voltage, a timer or sequencing means opens the switch in series with the input line so as to cut off the input to the circuit. This angular position will be determined by the frequency of the AC circuit and the values of the capacitor and resistor. The optimum or desired output DC voltage with respect to various values of resistors and capacitors for various frequencies can be calculated in the light of the mathematical expression for the transfer function of a sinusoidal value fed to an RC circuit. In this way, values providing a high fundamental output, a small output of harmonics, and zero quadrature voltages can be obtained.

What is claimed is:

1. In a circuit for the conversion of an AC input to a DC output which is a function of the changing fundamental AC sinusoidal value, in combination,
   a first AC input line and a return path;
   said first AC input line having first and second junction points,
   a first series switch in said first input line and disposed between said junction points;
   a fist resistor in said first input line and in series with said first switch and disposed between said first and second junction points;
   a second AC input line;
   said second AC input line having a third junction;
   a second series switch and a second resistor connected in series and disposed between said third and second junction points;
   a capacitor connected between said second junction point and said return path;
   said resistors disposed respectively between said series switches and said capacitor;
   a buffer amplifier fed by said resistors, discharging its output into a DC output line; and
   timer means adapted to open up said first and second series switches at predetermined angular positions of the changing input sinusoidal depending on the frequency of the AC circuit and the values of said capacitor and said first and second resistors, so as to obtain as an input to the buffer amplifier a DC voltage having a large percentage of the AC sinusoidal fundamental component,
   said buffer amplifier having a transfer function value, said transfer function value of said buffer amplifier being such as to provide a DC output directly proportional to said AC fundamental input.

2. In a circuit as claimed in claim 1, including:
   a third AC input line and a second return path;
   a third series switch in said third input line and disposed between a fourth and fifth junction points;
   a third resistor in series with said third input line and said third series switch and disposed between said fourth and fifth junction points;
   a fourth series switch and a fourth resistor connected in series between a sixth junction point and said fifth junction point;
   a second capacitor connected between said fifth junction point and second return path;
   a second buffer amplifier fed by said third and fourth resistors, discharging its output into said AC output line, wherein
   said timer means is adapted to selectively open said third and fourth series switches at predetermined angular positions of the changing input sinusoidal.

3. The circuit of claim 1 further comprising:
   a short circuit switch in parallel with said capacitor and connected between said second junction point and said return path effective to discharge the voltage on said capacitor when actuated to its short-circuited condition,
   said timer means including means for actuating said switch to its shorted circuited condition in response to said predetermined angular position of the changing input sinusoidal.

* * * * *